United States Patent [19]

Inoue

[11] Patent Number: 5,322,402
[45] Date of Patent: Jun. 21, 1994

[54] FASTENER HAVING AXIAL SLITS AND AXIALLY DISPLACED ENGAGEMENT CLAWS

[75] Inventor: Shoji Inoue, Chiba, Japan

[73] Assignees: Nifco, Inc.; Kinugawa Rubber Industrial Co., Ltd., Chiba, Japan

[21] Appl. No.: 40,309

[22] Filed: Mar. 30, 1993

[30] Foreign Application Priority Data

Mar. 30, 1992 [JP] Japan .................................. 4-26901

[51] Int. Cl.⁵ ............................................. F16B 19/00
[52] U.S. Cl. ..................................... 411/510; 411/41; 411/913
[58] Field of Search ............... 411/508, 509, 510, 908, 411/913, 41; 24/297

[56] References Cited

U.S. PATENT DOCUMENTS

| | | | |
|---|---|---|---|
| 3,213,494 | 10/1965 | Mayers et al. | 411/510 X |
| 3,494,244 | 2/1990 | Wayland. | |
| 3,905,270 | 9/1975 | Hehl | 411/509 |
| 4,704,059 | 11/1987 | Nakama et al. | 411/510 X |
| 4,762,437 | 8/1988 | Mitomi | 411/913 X |

FOREIGN PATENT DOCUMENTS

| | | | |
|---|---|---|---|
| 1464388 | 12/1966 | France | 411/509 |
| 1020694 | 2/1966 | United Kingdom | 411/510 |
| 1396103 | 6/1975 | United Kingdom | 411/510 |

Primary Examiner—Neill R. Wilson
Attorney, Agent, or Firm—Skjerven, Morrill, MacPherson, Franklin & Friel

[57] ABSTRACT

In a fastener for securing a weather strip to an automotive body panel provided with a cap portion for retaining the weather strip, a stem portion extending from the cap portion and adapted to be fitted into a through hole provided in the body panel, a radial flange provided in the stem portion adjacent the cap portion for abutting the outer surface of the body panel, and a plurality of engagement claws projecting radially from the stem portion for securing the stem portion in the through hole of the body panel, to reduce the force required for securing the fastener and facilitate the use of the fastener without compromising the fastening capability of the fastener, the stem portion has a substantially hollow cross section, and is provided with four axial slits at 90 degree interval. Thus, the separated parts of the stem portion are given with a sufficient yieldability without being affected by the rigidity of the radial flange, and the work of mounting the fastener is facilitated.

8 Claims, 3 Drawing Sheets

FASTENER HAVING AXIAL SLITS AND AXIALLY DISPLACED ENGAGEMENT CLAWS

TECHNICAL FIELD

The present invention relates to a fastener for securing a first member to a second member, and in particular to a fastener suitable for mounting a weather strip onto a panel member.

BACKGROUND OF THE INVENTION

Conventionally, the weather strip is used to fill the gaps between a body panel and a bonnet panel or a door panel of an automobile, and is mounted on the body panel by using a fastener made of synthetic resin such as the one illustrated in FIG. 3.

Referring to FIG. 3 showing a conventional fastener of the type disclosed in U.S. Pat. No. 3,494,244 issued to Wayland on Feb. 10, 1970, to the end of retaining a weather strip 2 which serves as a first member in this case, a fastener 21 is provided with an umbrella shaped cap 3 which retains the weather strip 2 by being received therein via an engagement hole 2a provided in the weather strip 2, and a stem portion 22 which is to be passed through a through hole 4a provided in a body panel 4 of an automobile serving as a second member on which the weather strip 2 is to be mounted. The stem portion 22 has a diameter slightly smaller than the diameter of the through hole 4a, and is provided with three annular flanges 23a through 23c in mutually spaced relationship in the longitudinal direction. The outer diameter of these flanges 23a through 23c is slightly larger than the diameter of the through hole 4a. Therefore, when pushing the stem portion 22 into the through hole 4a, the axial force therefor causes the flanges 23b and 23c to be elastically contracted thereby allowing them to be passed through the through hole 4a to the other side of the steel panel 4 where the flange 23b restores its original condition and secures the fastener 21 to the steel panel 4.

In such a conventional fastener 21, when pushing the fastener 21 into the through hole 4a of the body panel 4, since the flanges 23b and 23c had to be compressed for insertion, a relatively large force was required for this process. Therefore, it was a problem that the work involved in the use of the fastener required more efforts than desired.

BRIEF SUMMARY OF THE INVENTION

In view of such problems of the prior art, a primary object of the present invention is to provide an improved fastener of the above mentioned type which allows the force required for its insertion to be reduced, and reduces the effort required for its use.

A second object of the present invention is to provide a fastener of the above mentioned type which can securely mount a first member onto a second member.

According to the present invention, these and other objects of the present invention can be accomplished by providing a fastener, comprising: a retaining portion retaining a first member which is to mounted on a second member in the form of a plate member; a stem portion projecting from the retaining portion so as to be passed through an opening provided in the second member; a plurality of engagement claws projecting radially from the outer circumferential surface of the stem portion; and a radial external flange provided in a base end of the stem portion adjacent the retaining portion; the stem portion being provided with a substantially hollow cross section with an axial bore passed therethrough, and a plurality of slits extending longitudinally in the stem portion from a free end portion thereof to the radial external flange.

Thus, since the hollow stem portion is separated into circumferentially distributed parts by the slits, and the radial flange which may serve as axial positioning means when this fastener is attached to the second member on which the first member is to be mounted may also be optionally circumferentially separated by axial slits, the mutually separated parts of the stem portion can freely deflect in the radial direction without being hampered by the rigidity of the radial flange. Therefore, when the fastener is inserted in the through hole provided in the second member, the separated parts can easily yield radially inwardly as the engagement claws pass through the through hole, and, therefore, the force required for the insertion of the fastener is minimized. Once the fastener is fully received in the through hole, the separated parts can regain their original positions, and the engagement claws can effect their capability to prevent the fastener from being pulled out of the through hole.

According to a preferred embodiment of the present invention, the engagement claws project from a plurality of circumferentially distributed locations of the outer circumferential surface of the stem portion, an offset being provided between the engagement claws located in different circumferential positions, whereby the fastener can be adapted to panel members of different thicknesses substantially without any play. In other words, the fastener can adapt itself to minute changes in the thickness of the second member.

If the free end of the stem portion is provided with a substantially solid cross section, the free end of the fastener may have an appropriate rigidity for guiding the free end of the fastener 1 into the through hole of the body panel so as to further facilitate the use of the fastener.

BRIEF DESCRIPTION OF THE DRAWINGS

Now the present invention is described in the following with reference to the appended drawings, in which.

DETAILED DESCRIPTION OF THE PREFERRED EMBODIMENTS

Now a preferred embodiment of the present invention is described in the following with reference to the appended drawings.

Figure 1:
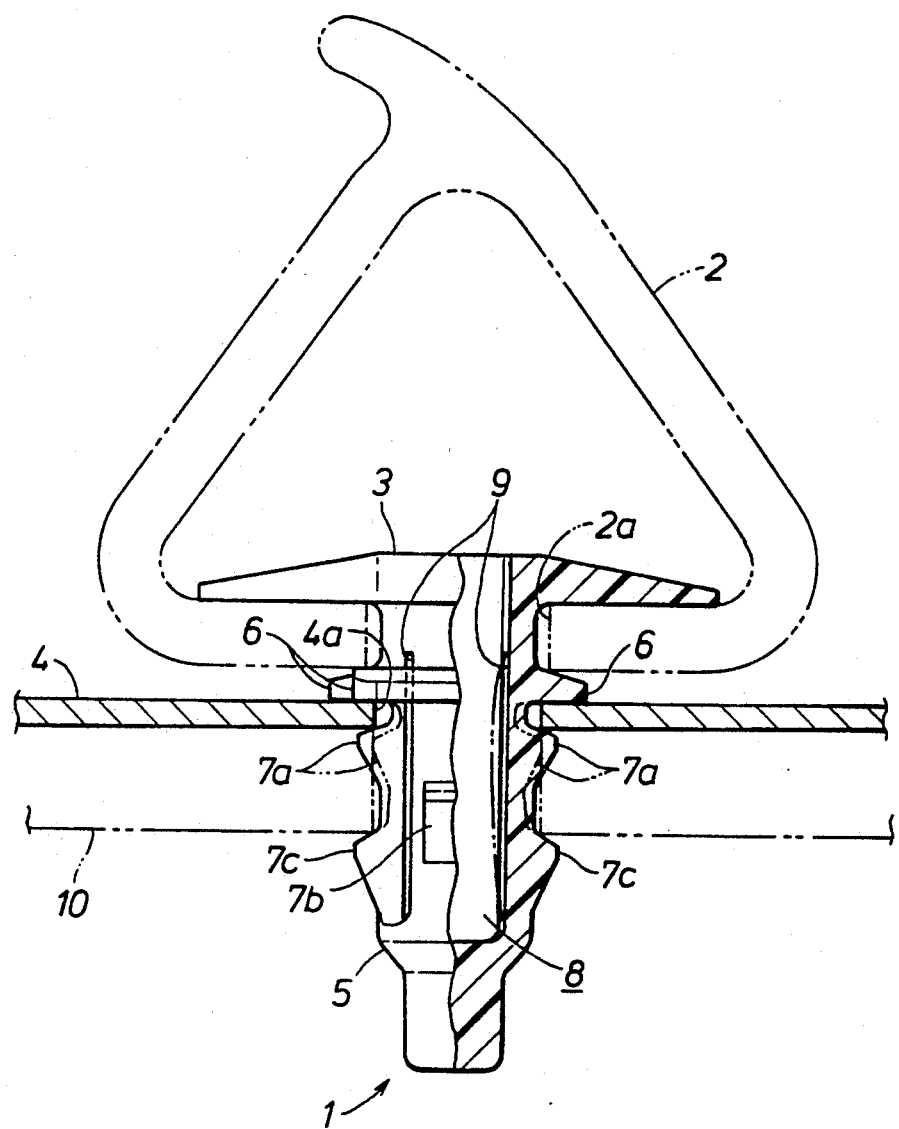
FIG. 1 is a partly broken-away sectional view of an essential part of a fastener according to the present invention.

FIG. 1 is a longitudinal sectional view of a fastener 1 according to the present invention. This fastener 1 is adapted to be used for mounting an automotive weather strip 2 serving as a first member to be mounted on a body panel 4 serving as a second member on which the first mentioned member is to be mounted all in the conventional manner.

As shown in the drawing, the weather strip 2 is provided with a hollow and triangular cross section, with one side thereof placed along the surface of the body panel 4. A middle part of the mentioned one side of the weather strip 2 is provided with an engagement hole 2a. In the same way as in the conventional fastener, a head portion of the fastener 1 is provided with an umbrella shaped cap portion 3 which has a greater expanse than the engagement hole 2a, and serves as a planar retaining portion. A stem portion 5 extending from the lower surface of the cap portion 3 as seen in the drawing is provided with a radial and external flange 6 below and adjacent the cap portion 3.

By elastically widening the engagement hole 2a and pushing the cap portion 3 into the inner chamber of the weather strip 2, the outer periphery of the engagement hole 2a of the weather strip 2 is held between the lower surface of the cap portion 3 and the radial flange 6, and the weather strip 2 is thereby retained by the fastener 1.

Below the radial flange 6 of the stem portion 5, first through third engagement claws 7a through 7c project radially from the outer circumferential surface of the stem portion 5, and are spaced from each other in such a manner that they are offset as seen in the longitudinal direction. More specifically, the engagement claws 7a through 7c are provided in pairs on diametrically opposed positions with respect to the central axial line of the stem portion 5, and the first and third engagement claws 7a and 7c are 90 degrees spaced from the second engagement claws 7b as seen in the circumferential direction. The diameter of the outer circumferential surface of the stem portion 5 is smaller than the diameter of the through hole 4a provided in the body panel 4, but the distance between each pair of engagement claws 7a through 7c is greater than the diameter of the through hole 4a.

The stem portion 5 has a hollow interior defining an axial bore 8 which has an open end in the upper surface of the cap portion 3. The wall defined by the stem portion 5 around the axial bore 8 is provided with four axial slits 9 which are spaced from each other by 90 degrees in the circumferential direction. Each of the slits 9 extends radially all the way across the thickness of the wall, longitudinally from one end thereof adjacent the third engagement claw 7c or the free end of the stem portion 5 to another end thereof located between the cap portion 4 and the radial flange 6. Thus, the axial slits 9 separate the middle part of the stem portion 5, as seen in the circumferential direction, into a pair of strips carrying the first and third engagement claws 7a and 7c and another pair of strips carrying the second engagement claws 7b.

Figure 2:
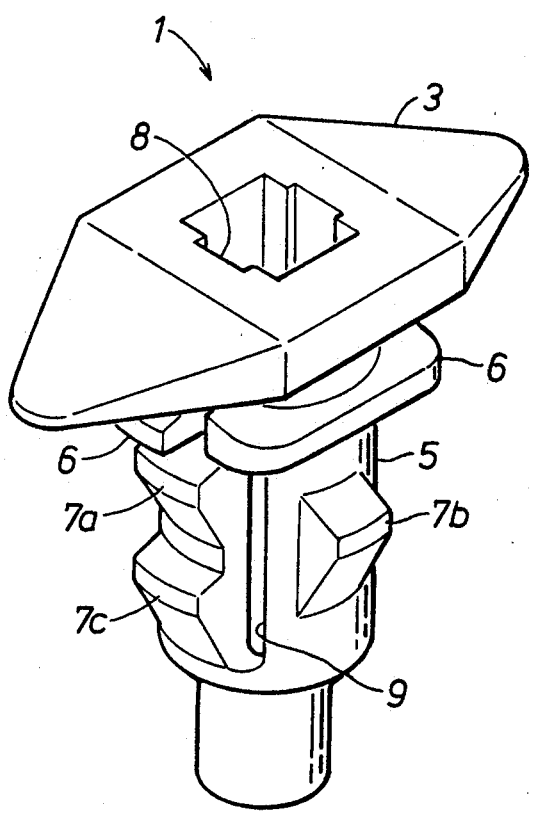
FIG. 2 is an overall perspective view of the fastener according the present invention.
Figure 3:
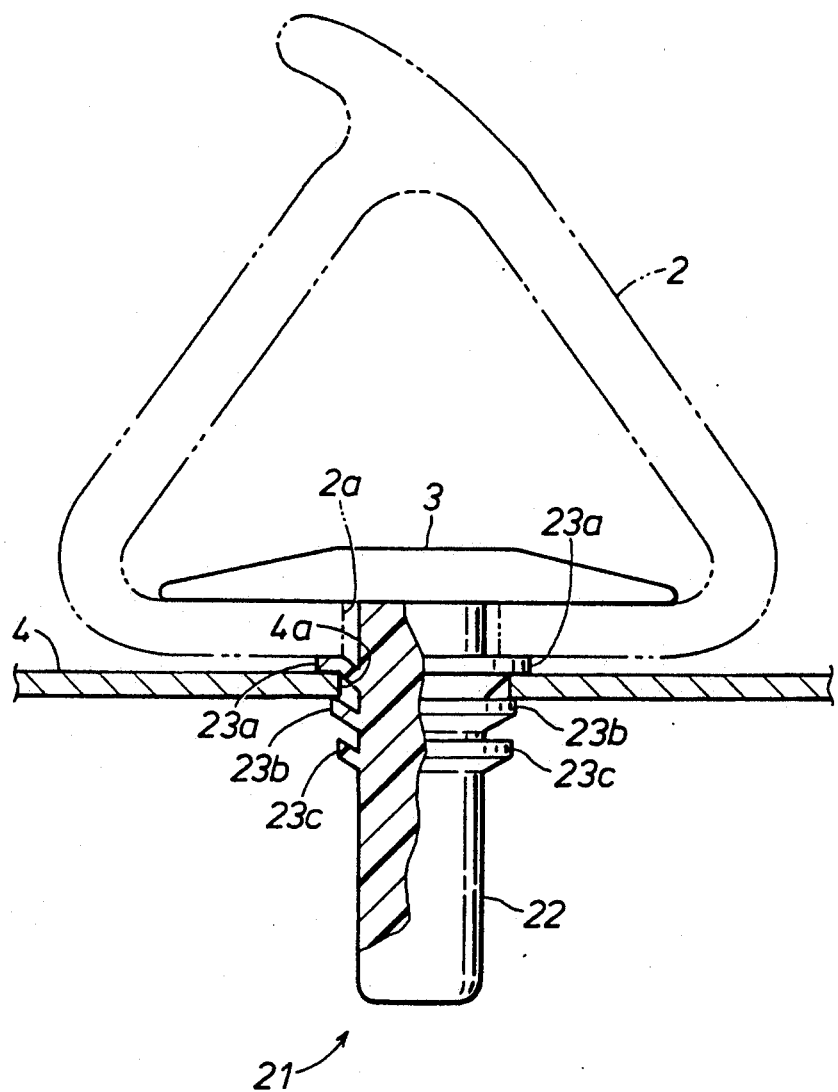
FIG. 3 is a partly broken-away sectional view of an essential part of a conventional fastener.

As clearly illustrated in FIG. 2, the second engagement claws 7b are located between the first and third engagement claws 7a and 7c as seen in the longitudinal direction.

When securing the fastener 1 having the above described structure to the body panel 4, the stem portion 5 is pushed into the through hole 4a. Since the middle part of the stem portion 5 is separated into strips by the axial slits 9 and can therefore relatively easily yield, the engagement claws 7a through 7c can relatively easily deflect radially inward as the stem portion 5 is pushed into the through hole 4a. In particular, according to the present embodiment, the radial flange 6 is also separated circumferentially by the axial slits 9, the radial flange 9 is not so rigid as to cause any inconvenience.

Since the free end portion of the stem portion 5 has a solid cross section, the fastener 1 is provided with a rigidity suitable for guiding the free end of the fastener 1 into the through hole 4a of the body panel 4.

Once the fastener 1 is thus inserted in the through hole 4a, the radial flange 6 abuts the outer surface of the body panel 4, and fixes the axial position of the fastener 1. At the same time, the strips of the stem portion 5 separated by the axial slits are elastically restored to their original positions. When the body panel 4 has a relatively small thickness as indicated by the solid line in FIG. 1, the first engagement claws 7a engage the reverse surface of the body panel 4, and the fastener 1 is secured to the body panel 4 with the body panel 4 securely held between the radial flange 6 and the first engagement claws 7a.

However, the body panel 4 may have different thicknesses from one part to another, and may have a different thickness depending on the condition of welded parts. Therefore, a fastener of this kind is desired to be capable of adapting itself to various thicknesses of the object member. According to the fastener of the present invention, as described above, the first through third engagement claws 7a through 7c are axially arranged in a mutually spaced relationship, and even when the object member consists of a relatively thick body panel 10 as indicated by the imaginary line in FIG. 1, the body panel 10 can be favorably held between the radial flange 6 and the third engagement claws 7c.

In particular, the first and third engagement claws 7a and 7c are in a staggered relationship to the second engagement claws 7b, the fastener 1 can adapt itself to small variations in the thickness of the body panel 4. Further, owing to this staggered arrangement, the first and third engagement claws 7a and 7c may be spaced from each other by a relatively large interval, the provisions of such claws on each of the strips of the stem portion 5 will not undesirably increase the rigidity of each of the strips. If the claws were arranged more closely to each other on each of the strips, the resulting increase in the effective thickness of each of the strips would increase the rigidity of the strip.

Although two engagement claws are provided on each of the first pair of strips and only one engagement claw is provided on each of the second pair of strips, it is possible to provide a desired number of engagement claws on each of the strips as required. By selecting the pitch of the engagement claws to a desired fineness, it is possible to improve the adaptability of the fastener to minute differences in the thickness. According to the present embodiment, one end of each of the axial slits 9 extends beyond the radial flange 6, but may also extends only up to the radial flange 6 without cutting through the radial flange. Even in the latter case, the rigidity of the radial flange 6 is somewhat mitigated, and will not seriously affect the yieldability of the engagement claws. As a matter of fact, the extent of the axial slits can be freely selected according to the desired level of yieldability of the stem portion 5.

Thus, according to the present invention, the provision of the axial slits extending to the radial flange which determines the axial positioning of the fastener, the influence of the rigidity of the radial flange is minimized and the engagement claws provided in the stem portions are permitted to deflect in the radially inward direction in such a manner that the force required to push the fastener into the through hole of the panel member serving as the second member may be of a relatively small magnitude, and the facility of using the fastener may be improved. The flexibility of the stem portion also improves the capability of the fastener to securely hold the first member to the second member.

Although the present invention has been described in terms of a specific embodiment thereof, it is possible to modify and alter details thereof without departing from the spirit of the present invention.

What we claim is:

1. A fastener, comprising:
   a stem portion extending in an axial dimension from an open end of said stem portion to a free end of said stem portion, a plurality of axial slits extending longitudinally in said stem portion to form a plurality of spring legs of said stem portion, said spring legs being joined together at said free end of said stem portion;
   a retaining cap portion extending radially outward from said open end of said stem portion;
   a radial flange extending radially outward from said stem portion adjacent said retaining cap portion;
   a first engagement claw extending radially outward from a first of said spring legs, a radial extent of said first engagement claw being disposed in a first radial plane; and
   a second engagement claw extending radially outward from a second of said spring legs, a radial extent of said second engagement claw being disposed in a second radial plane, no engagement claw on said second of said spring legs having a radial extent disposed in said first radial plane, no engagement claw on said first of said spring legs having a radial extent disposed in said second radial plane, said first and second radial planes being disposed with respect to said axial dimension between said radial flange and said free end of said stem portion.

2. The fastener of claim 1, wherein an axial bore is formed by said stem portion, said axial bore extending in an axial direction from said open end of said stem portion toward said free end of said stem portion, said axial bore terminating short of said free end so that said free end of said stem portion has a substantially solid cross section.

3. The fastener of claim 1, wherein said free end of said stem portion has a smaller circumference than said stem portion adjacent said radial flange.

4. The fastener of claim 1, wherein said stem portion also has a third spring leg and a fourth spring leg, respective ones of a plurality of engagement claws disposed on said first spring leg being aligned in an axial dimension with respective ones of a plurality of engagement claws disposed on said third spring leg, and wherein respective ones of a plurality of engagement claws disposed on said second spring leg are aligned in an axial dimension with respective ones of a plurality of engagement claws disposed on said fourth spring leg, said first spring leg being adjacent said second and fourth spring legs, said first spring leg being opposite said third spring leg.

5. The fastener of claim 4, further comprising a third engagement claw, said third engagement claw extending radially outward from said first of said spring legs, wherein said first engagement claw, said third engagement claw, said first of said spring legs and said radial flange together comprise means for engaging a material having a first thickness of a material having a second thickness.

6. The fastener of claim 4, wherein said radial flange extends radially outward from said stem portion in a radial plane, said axial slits extending longitudinally in said stem portion toward said open end of said stem portion through said radial plane of said radial flange.

7. A fastener, comprising:
   a stem portion extending in an axial dimension from an open end of said stem portion to a free end of said stem portion, a plurality of axial slits extending longitudinally in said stem portion to form a plurality of spring legs of said stem portion, said spring legs being joined together at said free end of said stem portion, said free end of said stem portion having a substantially solid cross section;
   a retaining cap portion extending radially outward from said open end of said stem portion; and
   a radial flange extending radially outward from said stem portion adjacent said retaining cap portion;
   means for engaging a material having a first thickness or a material having a second thickness so that said material having said first thickness is engaged against said radial flange and a plurality of engagement claws extending from said spring legs and so that said material having said second thickness is engaged against said radial flange and another plurality of engagement claws extending from said spring legs.

8. The fastener of claim 7, wherein said radial flange extends radially outward from said stem portion in a radial plane, said axial slits extending longitudinally in said stem portion toward said open end of said stem portion through said radial plane of said radial flange.

* * * * *